United States Patent [19]

Miura et al.

[11] Patent Number: 4,684,957

[45] Date of Patent: Aug. 4, 1987

[54] METHOD FOR OPERATION OF AN INK JET PRINTING HEAD

[75] Inventors: Masayoshi Miura, Kawasaki; Toshiyuki Iwasawa, Tokyo, both of Japan

[73] Assignee: Matsushita Electric Industrial Co., Ltd., Japan

[21] Appl. No.: 886,245

[22] Filed: Jul. 16, 1986

[30] Foreign Application Priority Data

Jul. 16, 1985 [JP] Japan ............................... 60-156428
Jul. 16, 1985 [JP] Japan ............................... 60-156429

[51] Int. Cl.4 ............................................ G01D 15/16

[52] U.S. Cl. ................................. 346/1.1; 346/140 R

[58] Field of Search ................ 346/1.1, 140, 165, 154; 358/296, 300

[56] References Cited

U.S. PATENT DOCUMENTS 4,258,371 3/1981 Sekine ................................ 346/140
4,555,717 11/1985 Miura ................................. 346/140

*Primary Examiner*—Joseph W. Hartary
*Attorney, Agent, or Firm*—Lowe, Price, LeBlanc, Becker & Shur

[57] ABSTRACT

Disclosed is a method for operation of an ink jet printing head of the type wherein printing ink is discharged from a plurality of ink nozzles toward a writing surface by the aid of an electric field established between a plurality of control electrodes associated with the ink nozzles and a common electrode in opposed relation to the control electrodes. In response to a picture element signal for controlling the discharge of ink from the ink nozzles, a control pulse is generated and applied to each of the control electrodes, while a pulse bias is generated and provided to the common electrode. The pulse bias is supplied thereto only in the presence of the control pulse. The minimum width of the control pulse is established to be greater than 1/fp and smaller than 2/fp where fp is the frequency of the picture element signal.

13 Claims, 6 Drawing Figures

METHOD FOR OPERATION OF AN INK JET PRINTING HEAD

BACKGROUND OF THE INVENTION

The present invention relates generally to ink jet printing, and more specifically to a method for operation of an ink jet printing head of the type wherein printing ink is discharged toward a writing surface by the aid of an electric field established between electrodes.

Various types of ink jet printing heads are known. One example of ink jet printing heads is disclosed in U.S. Pat. No. 4,555,717, illustrated in FIG. 1 of the present application, the multi-nozzle ink jet printing head comprising an air-ink nozzle plate 8 having a plurality of air-ink nozzles 1 successively arranged in a row and an ink nozzle plate 9 having a plurality of ink nozzles 2 successively arranged in a row and aligned with the air-ink nozzles 1 with one-to-one correspondence therebetween. A common electrode 3 is attached to a surface of the air-ink nozzle plate 8 and a plurality of control electrodes 4 are provided on a surface of the ink nozzle plate 9 in association with the plurality of ink nozzles 2. The common electrode 3 and control electrode 4 are provided for establishing an electric field therebetween to cause ink droplets held in the ink nozzles 2 to extend toward the air-ink nozzles 1 and to be carried by airstream supplied from a source of pressurized air and discharged through the air-ink nozzles 1.

One current method for the operation of such a multi-nozzle ink jet printing head involves a technique in which a pulse signal indicated by (a) of FIG. 2 is independently applied to each of the plurality of control electrodes 4 and a signal indicated by (b) is applied to the common electrode 3. The pulse signal (a) comprises pulses with a predetermined voltage Vs and different width (each will be hereinafter referred to as control pulse). The signal (b) is produced through superimposition of a pulse train with amplitude Vpb (which will be hereinafter referred to as bias pulse train) on a DC voltage Vb. In response to application of the control pulse thereto, printing ink is discharged toward writing paper wrapped around a cylindrical drum, for example.

The frequency of the bias pulse train superimposed on the DC voltage Vb is set to be equal to that of an input signal inputted to the ink jet printing head, i.e., a picture element signal, and the voltage Vpb or pulse width of the bias pulse is determined so that printing ink is not discharged in the case of absence of the control pulse. Generally, as the voltage Vpb or width of the bias pulse is closer to a limit value at which the discharge of ink is started, the discharge thereof is made easier, thereby enabling reduction of the voltage Vs of the control pulse and improving the response characteristic of the ink discharge. Therefore, it is desirable that the voltage Vpb or width of the bias pulse is set as close to the limit value as possible. However, the ink jet printing head is susceptable to the influence from mechanical impact and elecrical noise. When the ink jet printing head is adapted for a serial printer or the like, it will be subject to a mechanical impact as it is turned back after reaching an end of recording paper. If the occurrence of the mechanical impact is concurrent with the application of the bias pulse Vpb to the ink ject printing head, ink droplets held in the ink nozzles 2 are apt to be discharged in response to the mechanical impact irrespective of absence of the control pulse to be fed to the control electrode 4. Furthermore, the discharge of ink droplets will occur in response to the generation of a very low level noise when the pulse voltage or pulse width is set to a value extremely close to the limit.

On the other hand, a minimum control pulse voltage Vs which makes possible the discharge of ink from the ink nozzle 2 (which will be hereinafter referred to as threshold level Voh) depends on the width of the control pulse required for recording one dot on a writing surface (which will be hereinafter referred to as minimum control pulse width Pwmin). Namely, the shoter the minimum control pulse width Pwmin, the higher the threshold level Voh. For example, when Pwmin=300 μs, Voh=300 V, and when Pwmin=200 μs, Voh=380 V. The frequency fp of picture element signal is determined in accordance with the minimum control pulse width Pwmin, that is, Pwmin=1/fp. For example, when Vs=300 V, Pwmin=300 μs, and therefore the maximum frequency of the picture signal is 3.3 kHz. In order to further increase the frequency of the picture element signal from the viewpoint of increase in recording speed, it is required to make greater the control pulse voltage Vs. However, the increase in the control pulse, voltage Vs results in a high manufacturing cost and reduction in accuracy of operation.

SUMMARY OF THE INVENTION

It is therefore an object of the present invention is to provide a new and improved method for operation of an ink jet printing head which is capable of preventing ink from being discharged in response to the mechanical impact and electrical noise.

A further object of the present invention is to provide a method for operating an ink jet printing head which are capable of increasing recording speed without increasing the control pulse voltage applied to a control electrode.

According to the present invention, there is provided a method for operating an ink jet printing head of the type wherein printing ink is discharged from a plurality of ink nozzles toward a writing surface by the aid of an electric field established between a plurality of control electrodes associated with the ink nozzles and a common electrode in opposed relation to the control electrodes.

In accordance with the first feature of the invention, in response to a picture element signal for controlling the discharge of ink from the ink nozzles, a control pulse is generated and applied to each of the control electrodes, while a pulse bias is generated and provided to the common electrode. The pulse bias is supplied thereto only in the presence of the control pulse. This first feature makes it possible to meet the requirement for preventing printing ink from being discharged from an ink jet nozzle in response to a mechanical impact and electrical noise irrespective of the absence of the picture element signal.

In accordance with a second feature of the invention, the minimum width of the control pulse is established to be greater than 1/fp and smaller than 2/fp where fp is the frequency of the picture element signal, that is, the minimum pulse width is made greater than the width 1/fp of the picture element signal by a predetermined value. This second feature results in increasing the recording speed without increasing the control pulse voltage applied to the control electrode. Preferably, the prolongation of the pulse width is performed for all control pulses, because a circuit arrangement for the present invention is made easier.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
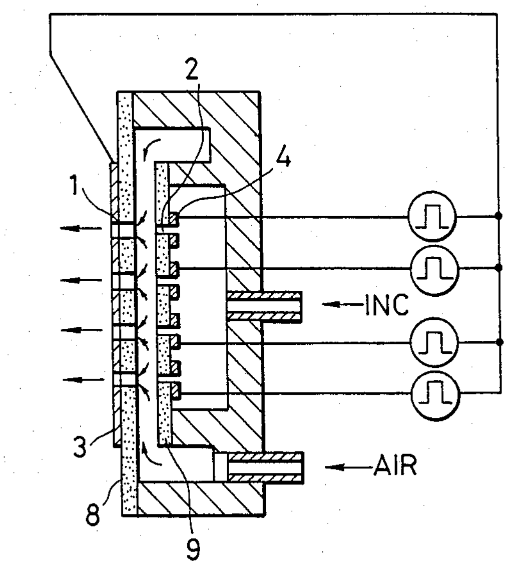
FIG. 1 PRIOR ART
FIG. 1 is a cross-sectional view of one example of ink jet printing head in which the present invention is incorporated.
Figure 2:
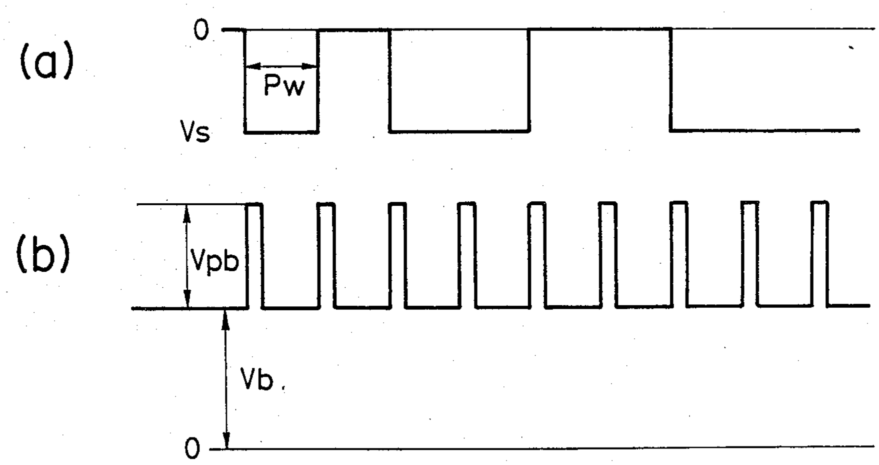
FIG. 2 PRIOR ART
FIG. 2 illustrates the waveforms of signals conventionally used for driving the ink jet printing head of FIG. 1.
Figure 3:
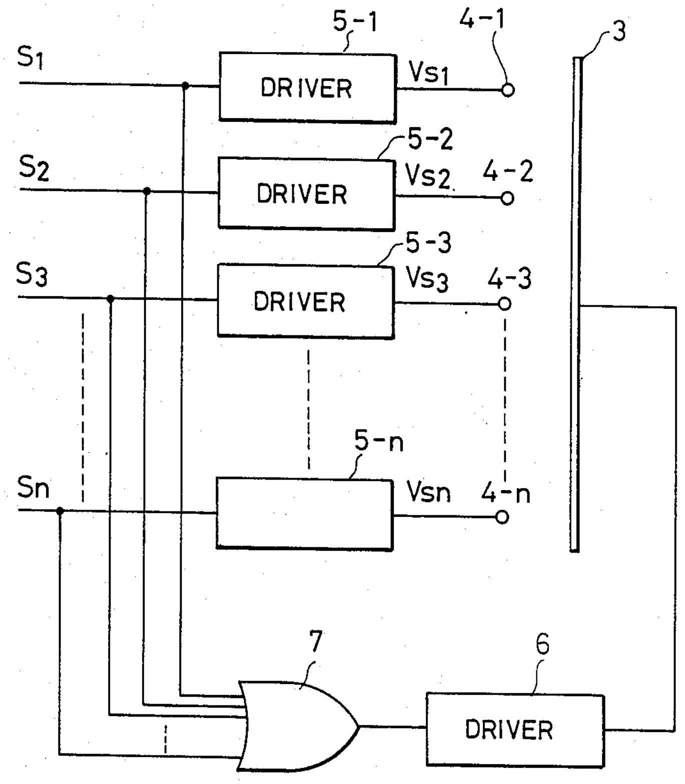
FIG. 3 is a block diagram showing a circuit for driving the ink jet printing head of FIG. 1 according to the present invention.

Referring now to FIG. 3, there is schematically illustrated a circuit arrangement for driving an ink jet printing head, which has the same structure as that of FIG. 1, according to the present invention. Input signals S1 to Sn indicative of picture elements are respectively accepted by drivers 5-1 to 5-n which in turn generate signals Vs1 to Vsn corresponding to the input signals S1 to Sn. The output signals Vs1 to Vsn of the drivers 5-1 to 5-n are respectively supplied as control pulses to control electrodes 4-1 to 4-n of the ink jet printing head. On the other hand, the input signals S1 to S2 are respectively coupled to an OR circuit 7, and therefore in response to the presence of at least one of the input signals S1 to Sn an output signal of the OR circuit 7 is generated and supplied to a driver 6. The output signal of the driver 6 is fed as a bias pulse to the common electrode 3 of the ink jet printing head, the output signal thereof being a pulse with voltage Vpb and the period of occurrence thereof corresponding to the period of occurrence of the picture elements. The reference character n is a positive integer. If n=1, the OR circuit 7 can be omitted. In this case, the input signal may be directly supplied to the driver 6.

Figure 4:
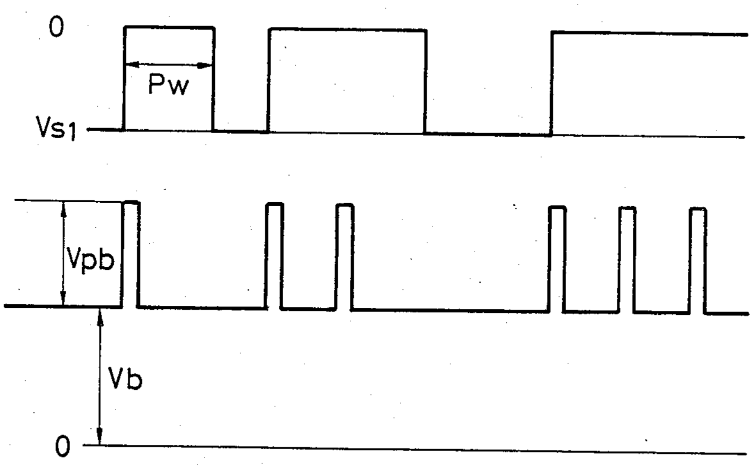
FIG. 4 shows the waveforms of signals used in the present invention.

FIG. 4 is an illustration of the waveforms of the output signal of the driver 5-1, i.e., control pulse, and the output signal of the driver 6, i.e., bias pulse. As seen from the figure, the bias pulse with voltage Vpb is developed during generation of the control pulse with voltage Vs1 in response to a picture element signal. The waveforms of the other drivers 5-2 to 5-n are similar to that of FIG. 4.

Figure 5:
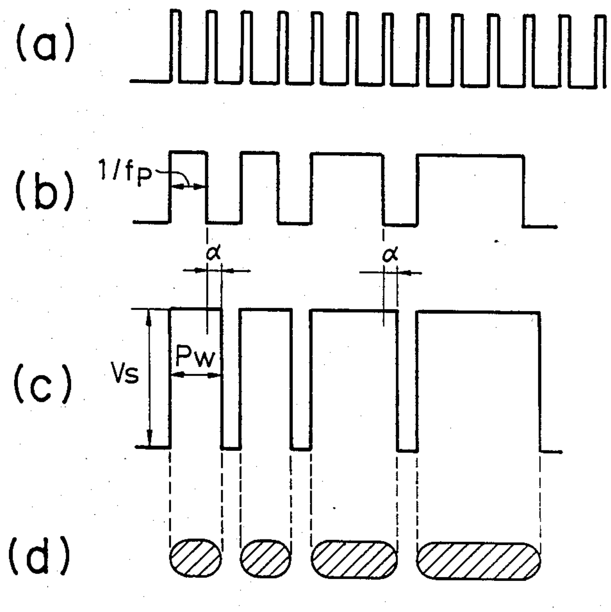
FIG. 5 illustrates signal waveforms useful for understanding a method for operation of the ink jet printing head of FIG. 1 according to the present invention.

FIG. 5 is a graphic illustration useful for describing the production of the output signals of the drivers, i.e., control pulses.

A pulse signal indicated by (a) of FIG. 5 is a clock pulse signal whose frequency is fp and which is used for determination of the period of occurrence of picture element signal, and a signal indicated by (b) is a picture signal generated in synchronism with the clock pulse and represents a picture of 010101101110. Numeral "1" indicates ON-state resulting in discharge of ink and "0" represents OFF-state resulting in no discharge thereof. The character (c) dipicts the control pulses with voltage Vs, which are supplied to one of the control electrodes 4. The pulse width Pw of the control pulse is greater by $\alpha$ than the pulse width 1/fp of the picture signal ($0<\alpha<1/fp$). The character (d) represents the configurations of dots recorded in accordance with the control pulses indicated by (c).

As described above, the pulse width Pw of the control pulse is arranged to become greater than 1/fp by $\alpha$ and therefore the pulse separation thereof is shortened in that degree. However, this results in making higher the frequency of the picture signal without increasing the voltage Vs, provided that the pulse width Pw are determined so that a blank is left between consecutive dots.

In experimentation wherein Vs=300 V, according to the prior art, the maximum frequency of picture signal is 3.3 kHz, that is, fp=1/Pw=3.3 kHz. On the other hand, according to the present invention, in the case of Pw=1/fp+100=300 μs ($\alpha$=100 μs), the maximum frequency of picture signal is increased up to 5 KHz, that is, fp=5 KHz.

In principle, the prologation of the pulse width Pw is required only for a control pulse of minimum pulse width to obtain satisfactory results. Namely, where ON-signal continues as in the case that a picture element signal is 0110 or 01110, the prolongation is not required for the control pulse corresponding to "11" or "111". However, it is also appropriate that the prolongation is performed for all control pulses as shown in FIG. 5. In this case, the circuit arrangement is simple. Therefore, the pulse width Pw can be generally represented as follows.

$$Pw = n/fp + \alpha$$

where:

$0<\alpha<1/fp$, n is a positive integer and, for example, becomes 2 in the case of the picture element signal of "11"

When N=1, the pulse width Pw is minimal and the minimum pulse width Pwmin is $1/fp < Pwmin < 2/fp$.

Figure 6:
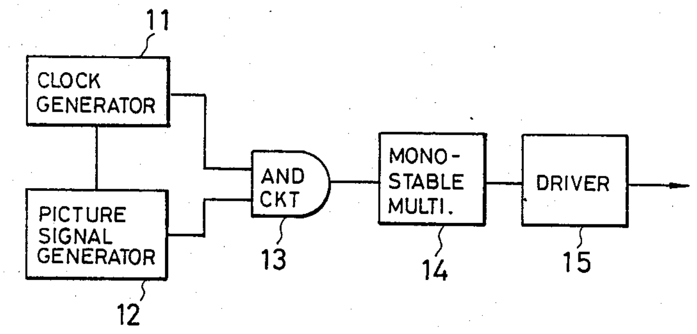
FIG. 6 is a block diagram showing a circuit arramgement embodying the present invention.

FIG. 6 illustrates one example of circuit arrangement for obtaining the signals shown in FIG. 5.

Illustrated at 12 in the figure is a picture signal generator for generating a picture element signal, as indicated by (b) of FIG. 5, in synchronism with a clock pulse generated by a clock pulse generator 11. The picture signal generator 12 and the clock pulse generator 11 are coupled to an AND circuit 13 and the output signal thereof is supplied to a re-triggerable monostable multivibrator 14. The output signal of the multivibrator 14 is supplied to a driver 15 to obtain the control pulse with voltage Vs as indicated by (c) of FIG. 5. In this circuit arrangement, the value of $\alpha$ is determined by establishing the width of a pulse outputted from the re-triggerable monostable multivibrator 14.

It should be understood that the foregoing relates to only a preferred embodiment of the invention, and that it is intended to cover all changes and modifications of the embodiment of the invention herein used for the purpose of disclosures, which do not constitute departures from the spirit and scopes of the invention. For example, although in the foregoing description the present invention is incorporated in the ink jet printing head shown in FIG. 1, the present invention can be adapted for various types of ink jet printing heads other than that of FIG. 1.

What is claimed is:

1. A method for operating an ink jet printing head of the type wherein printing ink is discharged from one or a plurality of nozzles toward a writing surface by the aid of an electric field established between one or a plurality of control electrodes and a common electrode disposed in opposed relation to said one or plurality of control electrodes, said method comprising the steps of:

(a) applying one or a plurality of first pulses to said one or plurality of control electrodes in response to one or a plurality of picture element signals; and (b) applying a second pulse to said common electrode only when printing ink is discharged in response to the application of said one or plurality of first pulses thereto.

2. A method as claimed in claim 1, wherein a predetermined DC voltage is always applied between said control electrode and said common electrode.

3. A method as claimed in claim 1, wherein the step (b) includes a step of generating said second pulse in accordance with logical OR of said plurality of first pulses applied to the plurality of control electrodes.

4. A method as claimed in claim 1, wherein a frequency of said second pulses corresponds to a period of occurrence of picture elements.

5. A method as claimed in claim 1, wherein a pulse width of said first pulse is greater than 1/fp and smaller than 2/fp where fp is the frequency of said picture element signal.

6. A method as claimed in claim 5, wherein the pulse width of said first pulse is established to be greater than 1/fp and smaller than 2/fp only when the pulse width is the minimum value.

7. A method as claimed in claim 1, wherein a pulse width of said first pulse is greater by a predetermined value than that of said picture element signal.

8. A method as claimed in claim 1, wherein a pulse width of said first pulse is determined in accordance with the following equation, $$Pw=n/fp+\alpha\ (0<\alpha<1/fp)$$

where fp = frequency of picture element signal $\alpha$ = constant n = the number of continuously arranged picture elements.

9. A method for operating an ink jet printing head of the type wherein printing ink is discharged from at least one nozzle toward a writing surface by the aid of an electric field established between at least one control electrode and a common electrode disposed in opposed relation to said control electrode, said method comprising the steps of:

(a) applying a first pulse to said control electrode in response to a picture element signal whose frequency is fp, a pulse width of said first pulse being greater than 1/fp and smaller than 2/fp when the pulse width is the minimum value; and (b) dicharging the printing ink by applying a second pulse to said common electrode only when said first pulse is applied to said control electrode.

10. A method for operating an ink jet printing head of the type wherein printing ink is discharged from at least one nozzle toward a writing surface by the aid of an electric field established between at least one control electrode and a common electrode disposed in opposed relation to said control electrode, said method comprising the steps of:

(a) applying a first pulse to said control electrode; and (b) applying a second pulse to said common electrode in synchronism with said first pulse only when said first pulse is applied to said control electrode.

11. A method as claimed in claim 10, wherein a predetermined DC voltage is always applied between said control electrode and said common electrode.

12. A method as claimed in claim 10, wherein a frequency of said second pulses corresponds to a period of occurrence of picture elements.

13. A method for operating an ink jet printing head of the type wherein printing ink is discharged from at least one nozzle toward a writing surface by the aid of an electric field established between at least one control electrode and a common electrode disposed in opposed relation to said control electrode, said method comprising the steps of:

(a) applying a predetermined DC voltage between said control electrode and said common electrode; and (b) applying a pulse to said control electrode in response to a picture element signal, a pulse width of said pulse being greater by a predetermined value than that of said picture signal.

* * * * *